United States Patent [19]
O'Young et al.

[11] Patent Number: 5,635,155
[45] Date of Patent: *Jun. 3, 1997

[54] HYDROTHERMAL SYNTHESIS OF OCTAHEDRAL MOLECULAR SIEVE

[75] Inventors: Chi-Lin O'Young, Poughkeepsie, N.Y.; Yan-Fei Shen, Storrs, Conn.; Richard P. Zerger, McPherson, Kans.; Steven L. Suib, Storrs, Conn.

[73] Assignee: Texaco Texaco Inc., White Plains, N.Y.

[*] Notice: The term of this patent shall not extend beyond the expiration date of Pat. No. 5,340,562.

[21] Appl. No.: 712,136

[22] Filed: Sep. 11, 1996

Related U.S. Application Data

[63] Continuation of Ser. No. 292,862, Aug. 19, 1994, abandoned, which is a continuation of Ser. No. 42,171, Apr. 2, 1993, Pat. No. 5,340,562.

[51] Int. Cl.$^6$ .................................................. C01G 45/12
[52] U.S. Cl. .................... 423/599; 423/700; 502/241
[58] Field of Search ................................ 423/599, 700, 423/705; 502/241

[56] References Cited

U.S. PATENT DOCUMENTS

| | | | |
|---|---|---|---|
| 2,306,610 | 12/1942 | Barrer | 502/60 |
| 2,413,134 | 12/1946 | Barrer | 502/60 |
| 4,277,360 | 7/1981 | Mellors et al. | 423/49 |

OTHER PUBLICATIONS

Golden et al, "Synthetic of Todorokite", Science, vol. 231, pp. 717–719 Feb. 1986.

Chemical Abstract (A) vol. 76 (4): 20753v, 1972 (no month).

Chemical Abstract (A) vol. 83(20): 166395w, 1975 (no month).

Chemical Abstract (CA) vol. 102(26): 230789t, 1984 (no month).

Chemical Abstract (A) vol. 107(12): 99867a, 1987 (no month).

Chemical Abstract (A) vol. 117 (22): 215537a, 1992 (no month).

Shen et al., "Octahedral Molecular Sieves, Characterizations and Applications", *Chemical Communications*, Issue 17 (1992) (no month).

*Primary Examiner*—Ngoc-Yen Nguyen
*Attorney, Agent, or Firm*—James L. Bailey; Henry H. Gibson; Harold J. Delhommer

[57] ABSTRACT

A process of synthesizing synthetic manganese oxide hydrates having various structures including hollandite and todorokite structure by hydrothermal synthesis. The products have a high degree of crystallinity, and thermal stability.

1 Claim, 4 Drawing Sheets

○ Amorphous
○ Nsutite, Intergrowth
□ Hollandite, 2 X 2
X Pyrolusite, 1 X 1
T Todorokite, 3 X 3

HYDROTHERMAL SYNTHESIS OF OCTAHEDRAL MOLECULAR SIEVE

This is a continuation of application Ser. No. 08/292,862 filed on Aug. 19, 1994, now abandoned, which is a continuation of application Ser. No. 08/042,171 filed Apr. 2, 1993, now U.S. Pat. No. 5,340,562.

BACKGROUND OF THE INVENTION

This invention relates to the synthesis of octahedral molecular sieves, mainly manganese oxides, equivalent to the structures of natural minerals, todorokite and hollandite.

DISCLOSURE STATEMENT

Hollandite ($BaMn_8O_{16}$), cryptomelane ($KMn_8O_{16}$), manjiroite ($NaMn_8O_{16}$), and coronadite ($PbMn_8O_{16}$) are all naturally occurring manganese minerals with a 3-dimensional framework tunnel structure. The structure consists of $MnO_6$ octahedra which share edges to form double chains, and the octahedra of the double chains share corners with adjacent double chains to form a 2×2 tunnel structure. The size of these tunnels is 5.46Å×5.46Å. Ba, K, Na and Pb ions are present in the tunnels and coordinated to the oxygens of the double chains. The identity of the tunnel cations determines the mineral species. The minerals are members of the hollandite-romanechite family which has a common double chain width, T(2×2).

Zolites and zeolite-like materials are the well-known molecular sieves. These materials use tetrahedral coordinated species $TO_4$, (T=Si, Al, P, B, Be, Ga, etc.,) as the basic structure unit. Through the secondary building units (SBU), a variety of frameworks with different pore structures are then built. Like tetrahedra, octahedra also can be used as the basis structural unit to form octahedral molecular sieves (OMS).

Herein below, we will refer to the materials with a 2×2 tunnel structure as hollandites, and identify each member by the identity of the tunnel ions. Such minerals can be characterized by the general formula:

$$A_{2-y}Mn_8O_{16} \cdot xH_2O$$

where A is the counter ion (alkali or alkaline earth metal or $Pb^{+2}$), Mn represents $Mn^{+4}$ and $Mn^{+2}$ and x is 6 to 10 with y varying from 0.8 to 1.3.

Because of their tunnel structure, the materials may be useful as shape selective catalysts and molecular sieves. Although K-hollandite and Ba-hollandite have reportedly been synthesized (as discussed by Parida et al, "Chemical Composition, Microstructure and other Characteristics of Some Synthetic $MnO_2$ of Various Crystalline Modifications", Electrochimica Acta, Vol. 26, pp. 435–43 (1981) and Strobel et al, "Thermal and Physical Properties of Hollandite-Type $K_{1.3}Mn_8O_{16}$ and $(K,H_3O)_xMn_8O_{16}$", J. Solid State Chemistry, Vol. 55, pp. 67–73 (1984). However, these syntheses are unreliable and considerable difficulties have been experienced by practitioners in this field.

Villa et al discussed the synthesis of oxide systems containing Mn in combination with other elements in "Co-Mn-Ti-K OXIDE SYSTEMS" Applied Catalysis, Vol. 26, pp. 161–173 (1986).

Torardi et al. discussed the synthesis of a hollandite-type molybdenum compound ($K_2Mo_8O_{16}$) by hydrothermal reaction of basic $K_2MoO_4$ solutions with Mo metal in "Hydrothermal Synthesis of a new molybdenum hollandite," Inorganic Chemistry, Vol. 23, pp. 3281–84 (1984).

The hollandites are representative of a family of hydrous manganese oxides with tunnel structures (also described as "framework hydrates") in which Mn can be present as $Mn^{+4}$ and other oxidation states, the tunnels vary in size and configuration, and various mono- or divalent cations may be present in the tunnels. Such cations may serve to form and support the tunnels in some cases. Clearfield describes various hydrous manganese oxides with tunnel structures in "Role of ion Exchange in Solid-State Chemistry," Chemical Reviews, Vol. 88, pp. 125–131 (1988). Pyrolusite or β-$MnO_2$ has tunnels only one $MnO_6$ octahedron square (1×1) or about 2.73 Å square, while in ramsdellite, $MnO_2$, these octahedra form (2×1)tunnels, about 2.73 Å×5.46 Å. Nsutite, γ$MnO_2$, is described as an intergrowth of pyrolusite and ramsdelite and also has (2×1)tunnels. Psilomelane, $Ba_2Mn_5O_{10} \cdot xH_2O$, and romanechite (with $K^{+2}$ substituted for $Ba^{+2}$ in the psifomelane formula) have (3×2) tunnels parallel to the cell b axes, about 5.46Å×8.19 Å. Todorokites, (Na,Ca,Mn) $Mn_3O_7 \cdot xH_2O$, have (3×3)tunnels, about 8.19Å square, and monoclinic cells. Todorokites and other species are described by Turner et al. in "Todorokites: A New Family of Naturally Occurring Manganese Oxides," Science, May 29, 1981, pp. 1024–1026, in which it is noted that since todorokites are often found in deep-sea manganese nodules containing high concentrations of copper and nickel, "it seems probable that the smaller transition elements substitute for $Mn^{+2}$ in the octahedral framework." The same article suggests a new partial nomenclature scheme for such manganese oxide structures—T(m,n), in which T donates a tunnel structure and the dimensions of the tunnels are indicated by (m,n). In this notation, the common dimensions responsible for intergrowth (m) is listed first, while (n) represents a variable dimension.

D. C. Golden et al., discloses the synthesis of todorokite in SCIENCE 231.717 (1986).

Herein below, we will refer to the (3×3)tunnel structure as OMS-1 and the (2×2) tunnel structure as OMS-2.

Many of these tunnel or framework hydrates in addition to the (2×2) hollandites have potential for use in separations, absorbent materials or catalyst materials. Hence, reliable and systematic synthesis methods for their preparation are desired.

Thus, the object of this invention is to provide an effective synthesis for manganese oxide molecular sieves, OMS-1 and OMS-2.

SUMMARY OF THE INVENTION

A new hydrothermal synthesis has been discovered by which manganese oxide hydrates such as hollandires with high surface area (at least 300 m/g) and good crystallinity (sharp X-ray diffraction patterns) can be synthesized.

In accordance with the present invention a process is provided for the hydrothermal synthesis of todorokite comprising:

(a) preparing a basic mixture of a manganous ($Mn^{+2}$) salt, a permanganate salt and a soluble base material and having a pH of at least about 13;

(b) aging said mixture at room temperature for at least 8 hours;

(c) filtering and washing said aged material to render said material essentially chlorine-free;

(d) ion exchanging said filtered material with a magnesium salt at room temperature for about 10 hours; and (e) filtering, washing and autoclaving said exchanged material to form said product todorokite.

The reaction conditions such as the ratio of manganous ion to permanganate ion, temperature and pH can be varied to produce manganese oxide hydrates of various structures, including those known as pyrolusite, nsutite, romanechite, todorokite, and hollandite can be prepared. Further in accordance with the invention, synthetic crystalline manganese oxide hydrates prepared in accordance with the claimed processes are provided, the products being similar in structure to various naturally occurring minerals, but offering greater purity and crystallinity.

In addition to the reactants recited in the process above, optional templates selected from materials such as alkali or alkaline earth metal ions, tetraalkylammonium ions or organic polymer chains can be employed to form the products. In certain preferred embodiments, the product is a 2×2 tunnel structure described generally herein as a hollandite structure.

DETAILED DESCRIPTION OF THE INVENTION

According to the present invention, a soluble manganous salt and a permanganate are reacted under conditions of temperature pressure and pH effective to produce the desired manganese oxide hydrates, with conditions varied to produce different structures of such minerals. The reaction mixture is heated in a closed system or vessel such as an autoclave so that a given temperature produces a predictable degree of autogenous pressure which is effective to complete the reaction in the desired time. In the present application, the term "autoclave" is used in a generic sense to indicate any closed reactant system providing a stable and predictable autogenous pressure for a given temperature.

As to the reactants, in general any suitable soluble manganous salt, whether inorganic or organic, can be employed in the processes of the present invention. Suitable salts include for example, the sulfate, nitrate, perchlorate and salts of organic acids, such as acetates. The sulfate, nitrate and acetate are presently preferred because they have been used effectively in the examples. In general, the permanganates can be an alkali or alkaline earth metal salt, including the permanganates of sodium, potassium, cesium, magnesium, calcium and barium. Permanganates including the ammonium or tetraalkylammonium salts can also be used. However, the counter ion or the permanganate ion in some cases is more than a vehicle for achieving solubility of the permanganate. The larger counter ions such as potassium and barium serve as templates for crystallization and remain in the tunnel structures of certain manganese oxide hydrates, particularly the hollandites; therefore, the counter ion for the permanganate can be selected to facilitate the selection, forming and stabilizing of a desired product, such as an hollandite, or to have a lesser effect (as with the smaller alkaline earth cations such as sodium and magnesium) to allow other preferred structures to form and/or to permit the template materials other than the counter ion to act on the reactant solution. The ionic radii of some alkali and alkaline earth metal cations which can be thus employed are listed below:

| Cation | Li | Na | K | Cs | Mg | Ca | Ba |
|---|---|---|---|---|---|---|---|
| r (Å) | 0.68 | 0.98 | 1.33 | 1.89 | 0.65 | 0.99 | 1.35 |

The molar ratio of permanganate ion to manganous ion, $[MnO_4^-]/[Mn^{+2}]$, which can be expressed as $[Mn^{+7}]/[Mn^{+2}]$ for convenience, is one of the critical factors or parameters in determining the nature of the product, and can range broadly from about 0.2 to about 3.0, preferably from about 0.25 to about 0.5, and most preferably from about 0.3 to about 0.4. In preferred embodiments, this ratio can range from about 0.3 to 0.4 for the production of todorokite about from 0.2 to about 1.4 for the production of hollandites from about 1.75 to about 2.2 for mixtures of hollandites and nsutites, and from about 2.5 to about 3 for nsutites.

Figure 4:
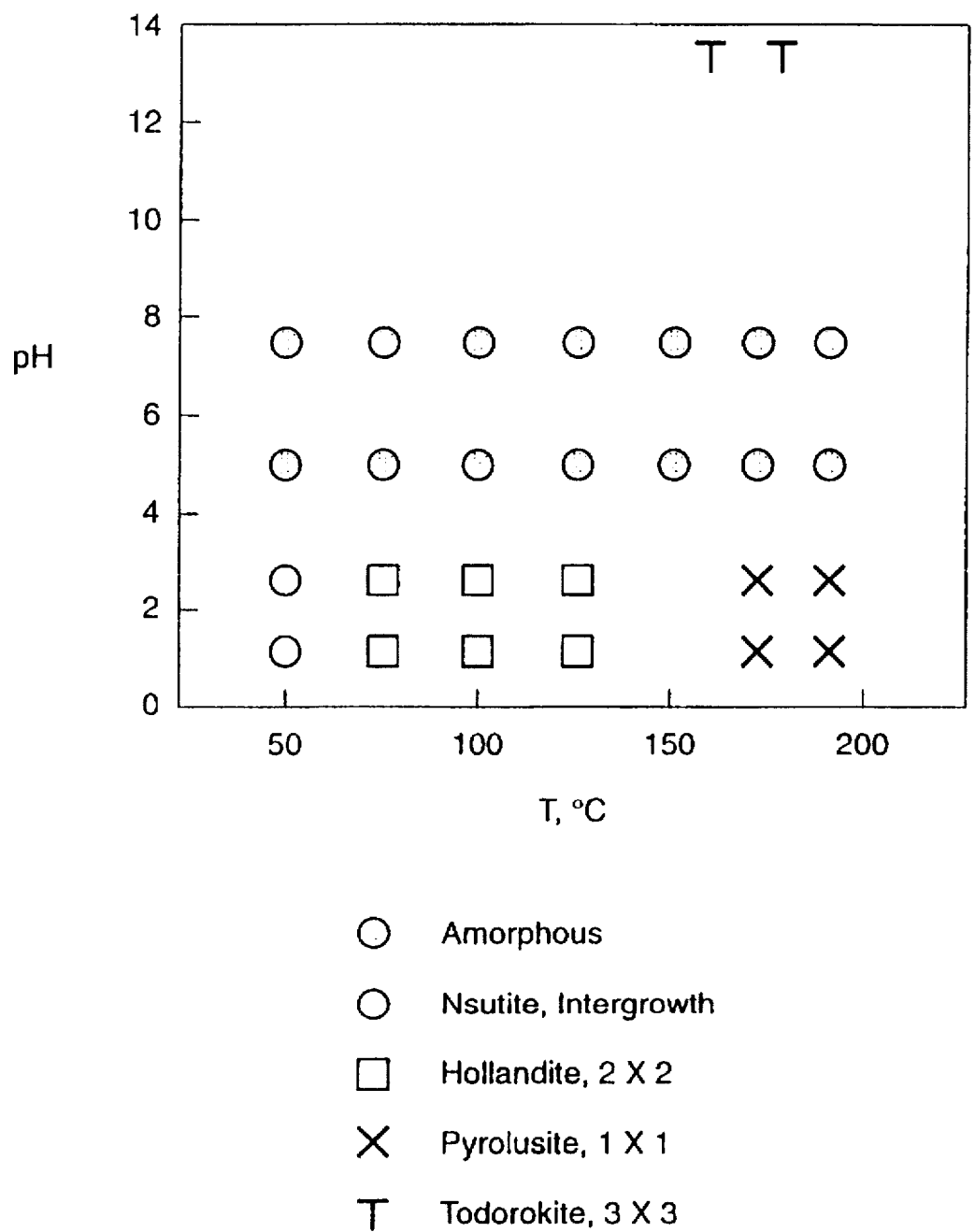
FIG. 4 illustrates the temperature and pH effects of the synthesis of manganese oxide molecular sieves.

The pH of the reaction mixture and the reaction temperature are interrelated parameters which can be varied in conjunction with the ratio of $[MnO_4^-]/[Mn^{+2}]$ and the nature of the template to influence the structure and the quality of the product. FIG. 4 provides a plot of pH versus temperature in which the regions in which certain structures can be expected to form are indicated, based upon observed results under various conditions and the results which are expected for reactions under slight variations of such conditions. The conditions for certain examples herein are also plotted. In general, the pH should be less than about 4.5, since above pH 5 amorphous materials rather than crystalline structures tend to form. Preferably, the pH is in the range of from about 0 to about 4, more preferably, from about 0.5 to about 2. A pH range from about 1 to about 3 is presently preferred for the production of hollandites. At high pH>13, todorokite is formed.

The reaction temperature can range broadly from about 40° to about 255° C., with the lower extreme of this temperature range tending to produce slower reactions. As can be seen in FIG. 4, given a pH range which is effective to produce crystalline products, temperatures in the range from about 40° to about 70° C. would tend to produce the nsutite structures which have generally low crystallinities but contain structures characterized by tunnels of dimension (1×n), where the basic unit dimension is a manganese oxide octahedron, and can be an integer of 1 or 2. Again, given an appropriate pH, the process of the invention can be carried out to produce materials of a hollandite structure (2×2) at temperatures ranging from about 70° C. to about 155° C. Preferably, for the production of hollandites, the temperature is in the range from about 80° to about 120° C. and most preferably from about 90° to about 110° C., and, for the production of todorokites, the temperate may range from about 130° C. to about 170° C. Given an appropriate pH range, the reaction can be carried out at temperature ranges of from about 155° to 255° C. to produce pyrolusite (1×1) structures.

In the present process of synthesizing todorokite, the manganous salt may be selected from the group consisting of $MnCl_2$, $Mn(NO_3)_2$, $MnSO_4$ and $Mn(CH_3COO)_2$. The permanganate salt is selected from the group consisting of $Na(MnO_4)$, $KMnO_4$, $C_5MnO_4$, $Mg(MnO_4)_2$, $Ca(MnO_4)_2$ and $Ba(MnO_4)_2$.

The base material according to the present invention may be selected from the group consisting of KOH, NaOH and tetraalkyl ammonium hydroxides. As for the magnesium salt used to ion exchange the filtered material, this salt may be selected from the group consisting of $MgCl_2$, $Mg(CH_3COO)_2$ and $MgSO_4$. The preferred magnesium salt being $MgCl_2$.

According to the present process the ion exchanged material is autoclaved at a temperature ranging from about 100° C. to about 200° C. for at least about 10 hours or preferably at about 130° C. to about 170° C. for about 2 to 5 days.

The present basic material is generally aged for at least 7 days. And, the product, todorokite, resulting from the present process is represented by the formula $$M^{n+}{}_a Mn^{2+}{}_b Mn^{4+}{}_c O_{12} nH_2O$$

wherein $M^{o+}$ is a +1 or +2 metal ion, a=0–2.0, b=0–2.0, c=4.0–6.0, and n=4.47 to 4.55

Various organic templates can be employed for synthesizing structures with tunnels ranging from 1×1 to 3×3 by the processes of the present invention. A preferred group of organic templates is selected from tetraakylammonium salts, in which the alkyl groups can have from 1 to about 5 carbon atoms. The alkyl groups associated with the cation can be the same or different and can be normal or branched in structure. Cations including methyl, ethyl or propyl groups are presently preferred. The anion can be any suitable inorganic or organic (e.g. acetate) ion which will allow the required solubility and either remain in solution without interfering with the reaction or, optionally, form a precipitate (e.g. $Base_4$) with the cation employed in the permanganate salt. Exemplary anions are the halides, hydroxides, bisulfates, sulfates, perchlorates and the like.

The materials have acid sites, including Lewis and Bronsted sites. Possible applications include acid catalyzed reactions such as isomerization and polymerization. Manganese oxide materials are well known oxidation catalysts and the methane activation experiments suggest that coupling to ($C_3$–$C_5$) hydrocarbons can be enhanced by the use of OMS-1.

Adsorption of hydrocarbons as large as 6.9A by OMS-1 has also been demonstrated. Other applications in the area of adsorption include use in separations.

Also useful as organic templates are polymer chains containing synthetic polymers such as those described as cationic polymers, quaternary ammonium polymers and ionene polymers by Daniels et al. in "Cationinic Polymers as Templates in Zeolite Crystallization," *J. Am. Chem. Soc.* 100, pp. 3097–3100 (1978). A preferred polymer having the structure as shown below is synthesized by the reaction of 1,4-diazabicyclo [2.2.2] octane with the bromoalkanes $Br(CH_2)_nBr$, where n may be 3, 4, 5, 6 or 14.

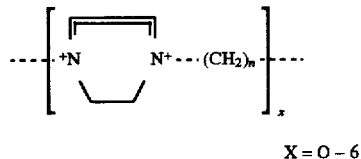

X = 0 – 6

Such cationic polymers and their use as templates for zeolite synthesis are further described by Davis et al. in "Synthesis of Gmelinite and ZSM-12 Zeolites with a Polymer Template," *J. Chem. Soc., Chem. Commun.* 1988, pp. 920–921. Both of these articles are incorporated herein by reference in their entirety.

Although the two structures of OMS-1 and OMS-2 are similar, the syntheses are quite different. The synthesis of OMS-1 uses layered manganese oxides as precursors. OMS-2 and layered materials are prepared by the redox reaction of $Mn^{+2}$ and $MnO_4^-$. The products are dependent on the reaction conditions: Temperature, pH of solution, ratio of $MnO_4^-/Mn^{+2}$, template, time of reaction. The purity of products is characterized by XRD, TEM, TGA, FTIR, and adsorption studies.

Figure 1A:
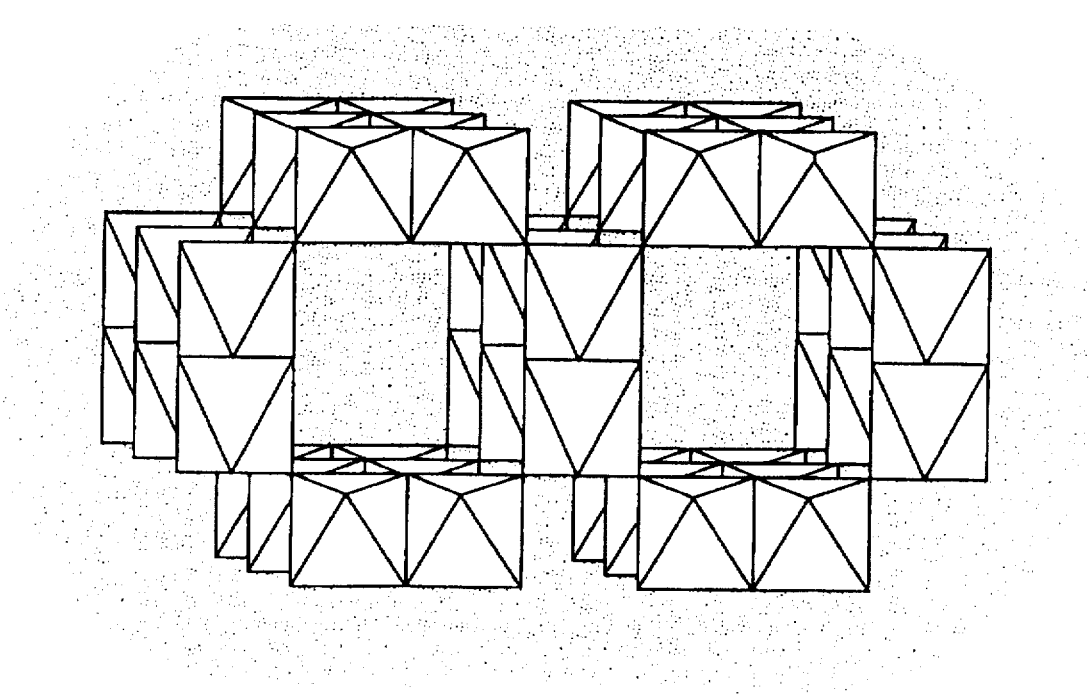
FIGS. 1a and 1b show the three-dimensional framework tunnel structures of hollandite (2×2) and todorokite (3×3), respectively.
Figure 1B:
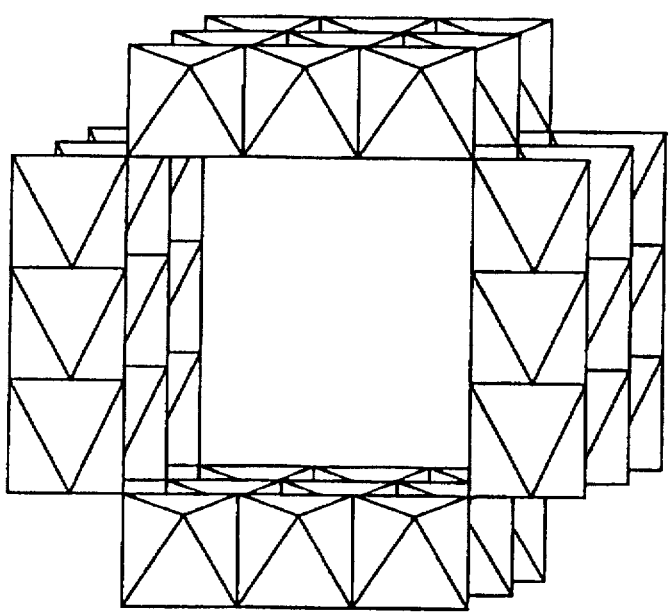
Figure 2A:
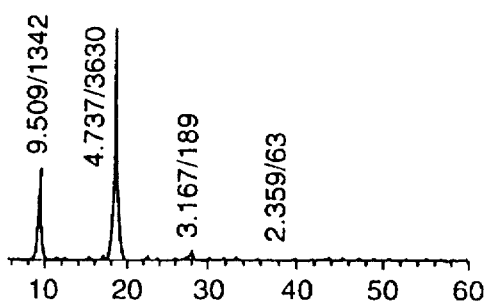
FIGS. 2A, 2B, 2C, 2D and 2E are XRD patterns of synthesized todorokite calcined at 100° C. (A), 200° C. (B), 300° C. (C), 400° C. (D) and 500° C. (E)
Figure 2B:
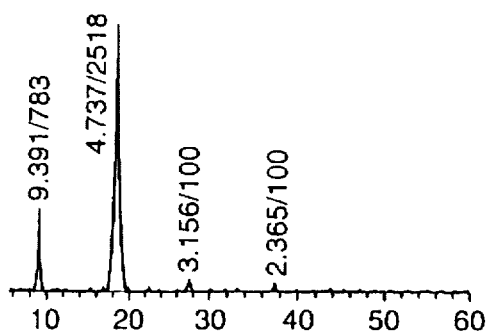
Figure 2C:
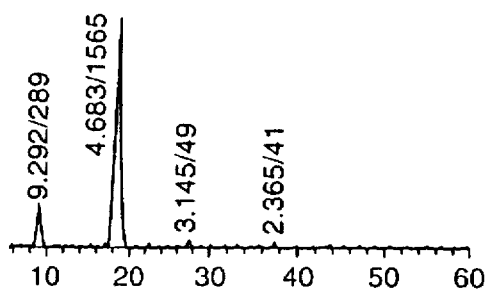
Figure 2D:
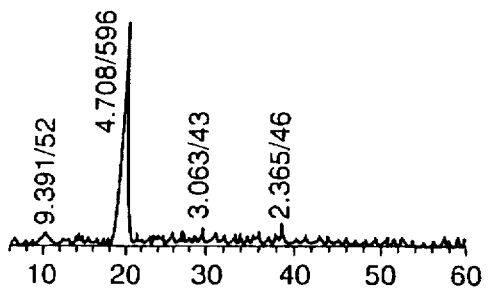
Figure 2E:
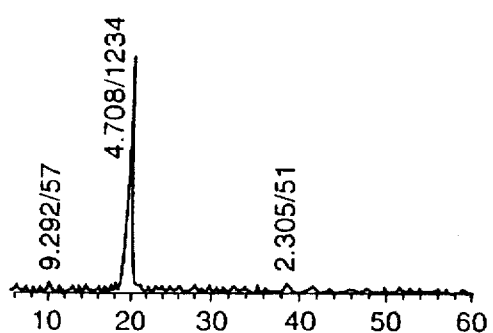

According to the present invention, a novel synthesis of bigger tunnels such as Todorokite (3×3) with a thermal stability up to about 500° C. The (3×3) tunnel structure is shown in FIG. 1.

The present synthesis of todorokite has a greater thermal stability than that reported by D. C. Golden et al., in Science 231.717 (1986, which is thermally stable up to only 300° C. Natural todorokite is stable up to 500° F., but the purity of the natural material is questionable. The material might contain layer materials, such as birnessite and buserite, which are the precursors of todorokite and have similar XRD patterns as those of todorokite. The synthesized material based on the present process has a good crystallinity and thermal stability according to TGA and XRD results.

Todorokite also can be synthesized under the following conditions:

1. The Mn(+2) salt can be any suitable soluble manganous salt, such as $Mn(NO_3)_2$, $MnSO_4$, and $Mn(CH_3COO)_2$.
2. The base material can be any soluble inorganic or organic base, such as KOH and tetraalkylammounium hydroxides.
3. The oxidizing agent can be permanganate, $H_2O_2$, and $O_2$. The preferable oxidizing agent is a permanganate salt such as $NaMnO_4$, $KMnO_4$, $CsMnO4$, $Mg(MnO_4)_2$, $Ca(MnO_4)_2$, and $Ba(MnO_4)_2$.
4. If permanganate was used, the molar ratio of $MnO_4/Mn(+2)$ is between 0.25 to 0.50, and the preferable ratio is 0.3 to 0.4.
5. The pH of the suspension is at least 13.
6. The suspension age can be at least 8 hrs at room temperature. The preferable aged time is at least 7 days.
7. The manganous Mg(+2) can be any suitable soluble salts, such as $MgCl_2$, $Mg(CH_3COO)_2$, or $MgSO_4$.
8. The autoclave temperature is between 100° to 200° C., and the preferable temperature is 130°–170° C.
9. The autoclavation time is at least 10 hrs, or preferably 2 to 5 days.

The following example is provided to illustrate the advantages of the present invention.

EXAMPLE I

Synthesis of Todorokite

A 50 ml of 5.0M NaOH solution was added to a 40 ml of 0.50 $MnCl_2$ solution with vigorously stirring to form $Mn(OH)_2$ sol at room temperature. Another 40 ml of 0.1M $Mg(MnO_4)_2$ solution was added dropwisely to the sol with stirring. The final pH of the suspension was about 13.8. After the suspension was aged for 8 days at room temperature, the solid material was filtered and washed with water until no Cl was detected. The material was ion exchanged with 1 L of M $MgCl_2$ at room temperate for 10 hours. The exchanged produce was filtered and washed with water and then autoclaved at 155° C. for 10 hours. The autoclaved product was filtered and washed with water, then dried at room temperature.

Figure 3:
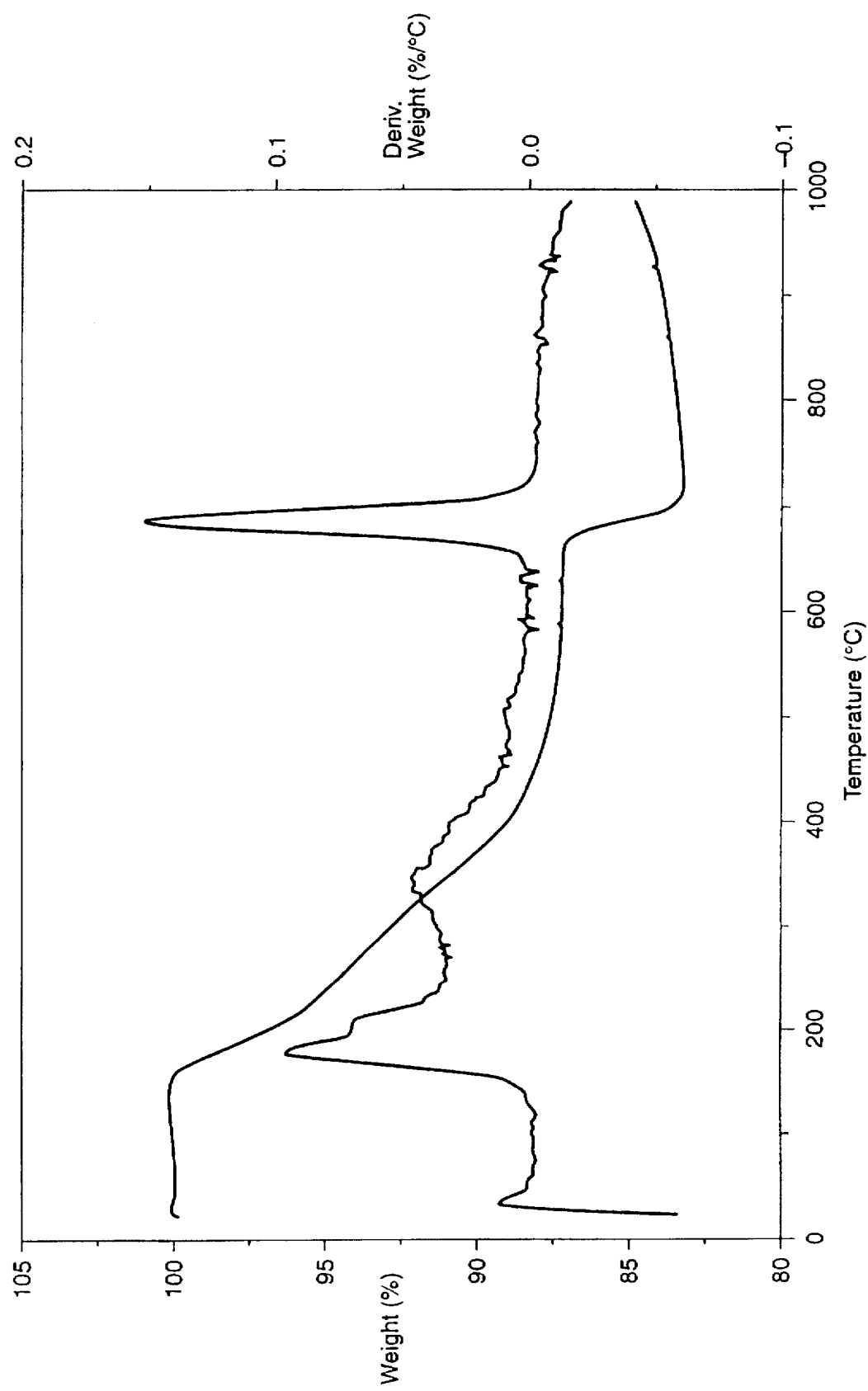
FIG. 3 is a TGA of synthesized todorokite.

XRD and TGA were used to study the crystallinity and thermal stability of the synthesized material. FIG. 2 shows the XRD of the synthesized todorokite with different calcination temperatures. The peaks at 9.5 and 4.7 A are the characteristic reflections of (100) and (200) planes. The 9.5 A peak intensity decreases with the calcination temperature. At 500° calcination, the peak has a small intensity. The results are consistent with the natural todorokite. FIG. 3 shows the TGA of the synthesized todorokite. Water is removed first before 400° C. The material is thermally stable up to 500° C. At higher temperatures, $Mn^{4+}$ is reduced with concomitant evolution of oxygen and structural transformation, like natural todorokite.

We claim:

1. A synthetic manganese oxide octahedral molecular sieve OMS-1 whose tunnel structure is 3×3 and being thermally stable at about 500° C., wherein said manganese oxide octahedral molecular sieve has an X-ray diffraction pattern essentially corresponding to FIGS. 2A to 2E when calcined at 100°, 200°, 300°, 400°and 500° C., respectively.

* * * * *

UNITED STATES PATENT AND TRADEMARK OFFICE
CERTIFICATE OF CORRECTION

PATENT NO. : 5,635,155
DATED : Jun. 3, 1997
INVENTOR(S) : Chi-Lin O'Young, Yan-Fei Shen, Richard P. Zerger and Steven L. Suib It is certified that error appears in the above-indentified patent and that said Letters Patent is hereby corrected as shown below:

Col. 2, line 17, "psifomelane" should be --psilomelane--;

Col. 5, line 16, "$M^{o+}$" should be --$M^{n+}$--.

Col. 6, line 18, "(1986," should be --(1986),--.

Col. 6, line 56, "vigorously" should be --vigorous--.

Col. 6, line 64, "produce" should be --product--.

Signed and Sealed this

Second Day of September, 1997

Attest:

BRUCE LEHMAN

Attesting Officer  Commissioner of Patents and Trademarks